United States Patent [19]

Kushner

[11] Patent Number: 4,626,037
[45] Date of Patent: Dec. 2, 1986

[54] HUB CAP MOUNTING BRACKET

[76] Inventor: Andrew Kushner, 145 Baker Dr., Pittsburgh, Pa. 15237

[21] Appl. No.: 792,511

[22] Filed: Oct. 29, 1985

Related U.S. Application Data

[63] Continuation of Ser. No. 558,329, Dec. 5, 1983, abandoned.

[51] Int. Cl.$^4$ .............. B60B 7/02; B60B 7/06
[52] U.S. Cl. .............. 301/108 S; 301/37 C; 301/37 S
[58] Field of Search .......... 301/37 CD, 37 C, 108 A, 301/108 S, 108 R, 37 S, 37 R, 63 DS

[56] References Cited

U.S. PATENT DOCUMENTS

| | | | |
|---|---|---|---|
| 2,219,156 | 10/1940 | Yankee | 301/37 C X |
| 2,231,183 | 2/1941 | Flandes | 301/63 DS |
| 2,264,000 | 11/1941 | McKechnie | 301/108 R X |
| 3,869,175 | 3/1975 | Spisak | 301/37 C |
| 4,235,476 | 11/1980 | Arvidsson | 301/108 R |
| 4,447,092 | 5/1984 | Beisch | 301/108 A |
| 4,470,638 | 9/1984 | Bartylla | 301/108 S |

FOREIGN PATENT DOCUMENTS 709755  8/1931  France .............. 301/108 R

Primary Examiner—David A. Scherbel
Attorney, Agent, or Firm—Webb, Burden, Robinson & Webb

[57] ABSTRACT

A bracket for mounting a hub cap on the end of a vehicle axle. The bracket has a substantially cylindrical base portion which is split and each end of the base portion at the split has an outwardly extending ear. Aligned holes are located in the outwardly extending ears and a bolt extends through the aligned holes in the ears to pull the ears toward one another when a nut is tightened on the bolt. Tabs extend outwardly from the base portion of the bracket at spaced points around the circumference of the base portion. The inner circumferential surface of the base portion of the bracket engages the circumferential surface of the end of a vehicle axle and the tabs extend parallel to the longitudinal axis of the vehicle axle to receive a hub cap.

2 Claims, 4 Drawing Figures

HUB CAP MOUNTING BRACKET

This application is a continuation of application Ser. No. 558,329, filed Dec. 5, 1983, now abandoned.

BACKGROUND OF THE INVENTION

Field of the Invention

The invention relates generally to a bracket for mounting a hub cap onto the end of a vehicle axle and more particularly to a bracket for use on the end of a vehicle axle which extends outwardly of the plane of the outer face of a wheel.

A hub cap is conventionally mounted on a wheel with small mounting screws or by engagement of threads on the outer peripheral portion of the hub cap which mate with threads formed on the hub portion of a wheel. A hub cap may also be mounted on a wheel by clip members which are integral with the wheel or with the hub cap and which cooperate with an annular rim on the wheel or the hub cap. However, these conventional arrangements for mounting hub caps on wheels cannot be used when mounting a hub cap on a large truck because the axle extends outwardly beyond the plane including the outer face of the wheel.

SUMMARY OF THE INVENTION

The present invention provides a bracket for mounting a hub cap on the end of a vehicle axle, especially a truck axle wherein the axle extends outwardly past the plane including the outer face of the wheel. Such is accomplished by providing a bracket having a substantially cylindrical base portion which is clamped around and embraces the cylindrical surface at the end of the vehicle axle. The bracket has a plurality of outwardly extending resilient tabs attached to the base portion which are formed with an outwardly angled portion and a hub cap engaging portion of the outer end so that the outer end of each tab engages the cylindrical rim of the hub cap to firmly hold the hub cap in place on the bracket so that the hub cap completely covers the end of the vehicle axle upon which the bracket is mounted.

DESCRIPTION OF THE PREFERRED EMBODIMENT

Figure 1:
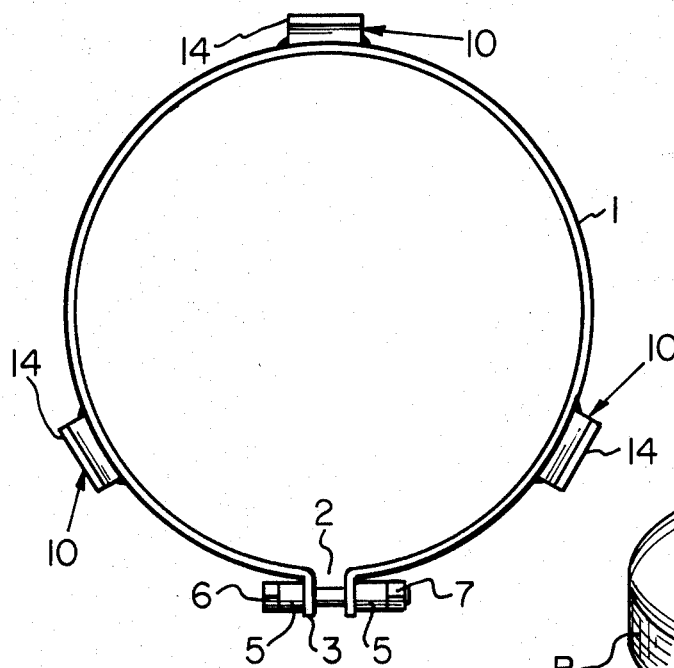
FIG. 1 is a plan view of the bracket.
Figure 3:
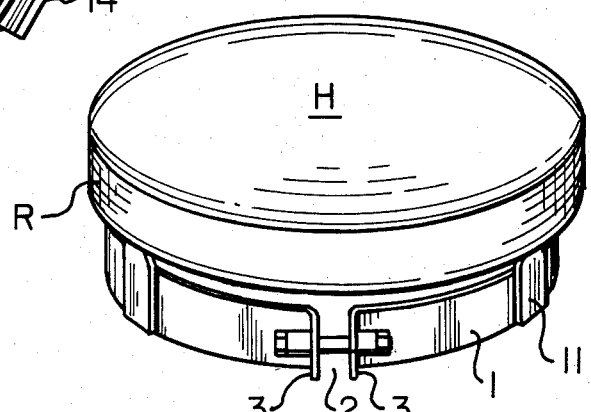
FIG. 3 is a perspective view of the bracket with a hub cap mounted thereon.

With reference to FIG. 1 of the drawings, the bracket consists of a substantially cylindrical base portion 1 which is split at 2. Each end of base portion 1 at split 2 is formed with an outwardly extending ear 3, and the ears have aligned holes therethrough. A threaded connecting bolt 4 extends through the aligned holes in ears 3. A spacing collar 5 is placed on one end of bolt 4 between the bolt head 6 and an ear 3, and a second spacing collar 5 is placed on the threaded end of bolt 4 between a nut 7 and the other ear 3. As will be obvious to those skilled in the art, the length of bolt 4 will be determined by the width of split 2 between ears 3. The collars space bolt head 6 and nut 7 outwardly from the ears so that a wrench can be placed on bolt head 6 and on nut 7 to tighten nut 7 on bolt 4 to draw the ears toward one another and decrease the width of split 2 to bring the inner circumferential surface of base portion 1 into tight engagement with the exterior circumferential surface of a vehicle axle. The spacing collars 5 may be dispensed with if the bolt head and the nut are long enough to permit a wrench to fit over them. Thus, the function of bolt 4 and nut 7 is to pull the ears 3 toward each other after the cylindrical base portion 1 of the bracket has been placed round a vehicle axle in order to tightly engage the inner circumferential surface of the base portion with the outer circumferential surface of the vehicle axle. The diameter of the base portion of the bracket will be determined by the diameter of the vehicle axle so that it is only slightly larger than the axle over which it is to be fitted when ears 3 are at the maximum spacing so that the bracket portion can be easily fitted over the vehicle axle.

Figure 2:
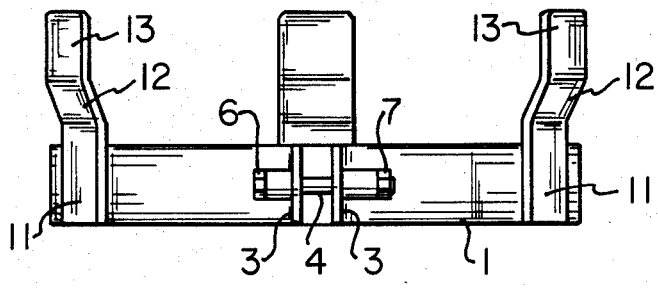
FIG. 2 is an elevation view of the bracket shown in FIG. 1.

As shown in FIG. 2 of the drawings, a plurality of tabs 10 are welded to the outer circumferential surface of base portion 1 of the bracket and extend outwardly therefrom in a direction substantially parallel with the longitudinal axis of the bracket portion. Each tab has a flat inner end portion 11 which is welded to the outer circumferential surface of base portion 1, an intermediate angled portion 12 which is angled outwardly away from the longitudinal axis of base portion 1 and a flat outer end portion 13 for engaging a hub cap. Each tab is made of a metal having a thickness such that the tab as a slight degree of spring so that it can be bent inwardly toward the longitudinal axis of base portion 1 when a hub cap H is placed over the outer end portions 13 so that outer end portions 13 tend to spring outwardly when the hub cap is in place and end portions 13 transmit an outward force to the inner surface of annular rim R of hub cap H to hold the hub cap in tight engagement with them and thereby mount the hub cap on the bracket. If desired, a ridge or bead may be formed in the outer surface of each end portion 13 where the end portion joins angled portion 12. Alternatively, a member may be welded to the surface of end portion 13 where it joins angled portion 12 to form a protrusion on the surface of end portion 13. The ridge or protrusion on the surface of end portion 13 will assist in holding a hub cap H on the bracket since it will engage the annular lip formed on the inner surface of the edge of rim R of the hub cap.

While three tabs are shown extending outwardly from base portion 1 of the bracket, the number of tabs may be greater if desired. It has been determined that three tabs are necessary to hold a hub cap on the bracket and this is the minimum number which may be used. As shown in FIG. 1 of the drawings, the tabs are attached to the base portion of the bracket at approximately 120° apart.

Figure 4:
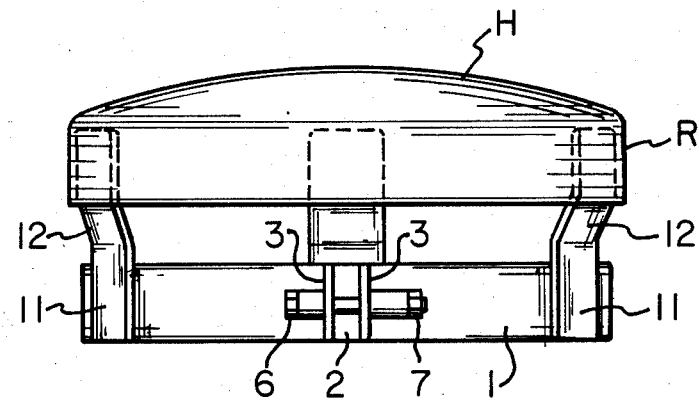
FIG. 4 is an elevation view of the bracket and hub cap shown in FIG. 3.

When a hub cap is to be installed on the end of a vehicle axle, the base portion of the bracket is slipped over the end of the axle with the nut 7 in the outermost position on the threaded end of bolt 4. The base portion of the bracket is moved along the axle until the outer ends 14 of tabs 10 are in approximately the same plane as the end of the axle. When the base portion is properly positioned along the axle, nut 7 is tightened on bolt 4 to pull ears 3 toward each other to firmly hold the base portion on the axle. Next a hub cap of the proper diameter is placed over the outer end portion 13 of one of the tabs, and the other two tabs are depressed inwardly toward the axis of the base portion until rim R of hub cap H can be located outside of the outer end portion of the two depressed tabs. When the hub cap is in place, the tabs are released, and the end portion of each tab springs outwardly until they firmly engage the inner surface of rim R of hub cap H as shown in FIG. 4 of the drawings at which point the hub cap is firmly held on the bracket and covers the end of the vehicle axle.

While a preferred embodiment of the invention has been shown and described herein, it will be understood by those skilled in the art that the invention is defined by the following claims.

I claim:

1. A bracket for mounting a decorative hub cap on the end of a vehicle axle, said bracket comprising a substantially cylindrical base portion having a longitudinal axis adapted to be substantially coaxial with the longitudinal axis of a vehicle axle when said cylindrical base portion is mounted on a vehicle axle, said cylindrical base portion having a split therein, each end of said cylindrical base portion at said split having an outwardly extending ear, aligned holes in each of said outwardly extending ears, means extending through said aligned holes adapted to pull said ears toward one another, three resilient tabs located at spaced points around the circumference of said cylindrical base portion and extending outwardly from said cylindrical base portion in a direction substantially parallel to the longitudinal axis of said cylindrical base portion, each of said tabs having a flat inner end portion attached directly to said cylindrical base portion and a flat outer end portion substantially parallel to said flat inner end portion adapted to support a decorative hub cap and an intermediate portion angled outwardly away from the longitudinal axis of said cylindrical base portion integral with said inner and outer end portions, said outer end portion of each of said tabs lying in a circle coaxial with said cylindrical base portion and having a diameter slightly greater than the diameter of said cylindrical base portion, whereby the inner circumferential surface of said cylindrical base portion of said bracket is adapted to engage the circumferential surface of the end of a vehicle axle and said outer end portion of each of said tabs is adapted to tightly engage a decorative hub cap to hold said decorative cap onto a vehicle axle.

2. A bracket for mounting a hub cap on the end of a vehicle axle, said bracket comprising a substantially cylindrical base portion having a longitudinal axis adapted to be substantially parallel with the longitudinal axis of a vehicle axle when mounted on a vehicle axle, said base portion having a split therein, each end of said base portion at said split having an outwardly extending ear, aligned holes in each of said outwardly extending ears, means extending through said aligned holes adapted to pull said ears toward one another to tighten said base portion on a vehicle axle, a plurality of tabs attached directly to said base portion at spaced points around the circumference of said base portion and extending outwardly from said base portion in a direction substantially parallel with the longitudinal axis of said base portion, each of said tabs having a flat inner end portion integral with said base portion and substantially parallel with the longitudinal axis of said base portion, an intermediate angled portion having a first end integral with said inner end portion and angled outwardly away from the longitudinal axis of said base portion and a flat outer end portion integral with said intermediate angled portion and substantially parallel to said flat inner end portion, whereby the inner circumferential surface of said base portion of said bracket is adapted to engage the circumferential surface of the end of a vehicle axle and said tabs are adapted to receive a hub cap to hold said hub cap on said vehicle axle.

* * * * *